(12) United States Patent
Noonan et al.

(10) Patent No.: US 7,287,107 B2
(45) Date of Patent: Oct. 23, 2007

(54) METHOD AND APPARATUS FOR PASSIVE PCI THROTTLING IN A REMOTE SERVER MANAGEMENT CONTROLLER

(75) Inventors: Robert L. Noonan, Crystal Lake, IL (US); Theodore F. Emerson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 859 days.

(21) Appl. No.: 10/037,502

(22) Filed: Jan. 4, 2002

(65) Prior Publication Data

US 2003/0131119 A1    Jul. 10, 2003

(51) Int. Cl.
*G06F 3/00* (2006.01)

(52) U.S. Cl. .............. 710/60; 710/52; 710/57; 710/59; 345/545; 345/547; 345/558

(58) Field of Classification Search .............. 710/3, 710/52, 62, 313, 107, 110; 709/223–226
See application file for complete search history.

(56) References Cited

U.S. PATENT DOCUMENTS

| | | | | |
|---|---|---|---|---|
| 5,299,315 A * | 3/1994 | Chin et al. | ............ | 710/110 |
| 5,790,895 A | 8/1998 | Krontz et al. | ............ | 395/884 |
| 5,898,861 A | 4/1999 | Emerson et al. | ............ | 395/500 |
| 5,907,689 A * | 5/1999 | Tavallaei et al. | ............ | 710/110 |
| 6,233,634 B1 * | 5/2001 | Clark et al. | ............ | 710/313 |
| 6,397,287 B1 * | 5/2002 | Brown et al. | ............ | 710/305 |
| 6,476,854 B1 * | 11/2002 | Emerson et al. | ............ | 348/143 |
| 6,694,389 B2 * | 2/2004 | Coates et al. | ............ | 710/52 |
| 6,728,808 B1 * | 4/2004 | Brown | ............ | 710/107 |
| 6,851,008 B2 * | 2/2005 | Hao | ............ | 710/305 |

OTHER PUBLICATIONS

Emerson et al., "Operating System Independent Method and Apparatus for Graphical Remote Access," U.S. Appl. No. 09/438,253, filed Nov. 12, 1999.
Frantz et al., "USB Virtual Devices," U.S. Appl. No. 09/544,573, filed Apr. 6, 2000.
Emerson et al., "Video Eavesdropping and Reverse Assembly to Transmit Video Action to a Remote Console," U.S. Appl. No. 08/733,254, filed Oct. 18, 1996.
"Compaq Remote System Management for Industry-Standard Servers," Compaq Computer Corporation Technology Brief, Sep. 2001.
"Remote Server Management with Integrated Remote Console," Compaq Computer Corporation Technology Brief, Oct. 21, 1996.

* cited by examiner

*Primary Examiner*—Kim Huynh
*Assistant Examiner*—Eron J. Sorrell

(57) ABSTRACT

The disclosed embodiments relate generally to remote server management technology. More particularly, the embodiments relate to improving the ability of remote server management tools to snoop large amounts of data, including graphical video data, from a communication bus. When snooping the communication bus for data, there is a risk that a storage device gathering the data will be overrun when the volume of relevant data snooped is high. The embodiments relate to a method and apparatus for passively throttling the communication bus to prevent overrun of devices storing snooped data.

22 Claims, 4 Drawing Sheets

METHOD AND APPARATUS FOR PASSIVE PCI THROTTLING IN A REMOTE SERVER MANAGEMENT CONTROLLER

BACKGROUND OF THE INVENTION

1. Field of the Invention

This invention relates generally to remote server management technology. More particularly, the invention relates to improving the ability of remote server management tools to snoop large amounts of video data, including graphical video data.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since the introduction of the first personal computer ("PC") over 20 years ago, technological advances to make PCs more useful have continued at an amazing rate. Microprocessors that control PCs have become faster and faster, with operational speeds eclipsing the gigahertz (one billion operations per second) and continuing well beyond.

Productivity has also increased tremendously because of the explosion in development of software applications. In the early days of the PC, people who could write their own programs were practically the only ones who could make productive use of their computers. Today, there are thousands and thousands of software applications ranging from games to word processors and from voice recognition to web browsers.

In addition to improvements in PC hardware and software generally, the technology for making computers more useful by allowing users to connect PCs together and share resources between them has also seen rapid growth in recent years. This technology is generally referred to as "networking." In a networked computing environment, PCs belonging to many users are connected together so that they may communicate with each other. In this way, users can share access to each other's files and other resources, such as printers. Networked computing also allows users to share internet connections, resulting in significant cost savings. Networked computing has revolutionized the way in which business is conducted across the world.

Not surprisingly, the evolution of networked computing has presented technologists with some challenging obstacles along the way. One obstacle is connecting computers that use different operating systems ("OSes") and making them communicate efficiently with each other. Each different OS (or even variations of the same OS from the same company) has its own idiosyncrasies of operation and configuration. The interconnection of computers running different OSes presents significant ongoing issues that make day-to-day management of a computer network challenging.

Another significant challenge presented by the evolution of computer networking is the sheer scope of modern computer networks. At one end of the spectrum, a small business or home network may include a few client computers connected to a common server, which may provide a shared printer and/or a shared internet connection. On the other end of the spectrum, a global company's network environment may require interconnection of hundreds or even thousands of computers across large buildings, a campus environment, or even between groups of computers in different cities and countries. Such a configuration would typically include a large number of servers, each connected to numerous client computers.

Further, the arrangements of servers and clients in a larger network environment could be connected in any of a large number of topologies that may include local area networks ("LANs"), wide area networks ("WANs") and municipal area networks ("MANs"). In these larger networks, a problem with any one server computer (for example, a failed hard drive, failed network interface card or OS lock-up to name just a few) has the potential to interrupt the work of a large number of workers who depend on network resources to get their jobs done efficiently. Needless to say, companies devote a lot of time and effort to keeping their networks operating trouble-free to maximize productivity.

An important aspect of efficiently managing a large computer network is to maximize the amount of analysis and repair that can be performed remotely (for example, from a centralized administration site). Tools that facilitate remotely analyzing and servicing server problems help to control network management costs by reducing the number of network management personnel required to maintain a network in good working order. Remote server management also makes network management more efficient by reducing the delay and expense of analyzing and repairing network problems. Using remote management tools, a member of the network management team may identify problems and, in some cases, solve those problems without the delay and expense that accompanies an on-site service call to a distant location.

Remote management tools can communicate with a managed server using either (1) in-band communication or (2) out-of-band communication. In-band communication refers to communicating with the server over a standard network connection such as the managed server's normal Ethernet connection. In-band communication with the server is, accordingly, only possible when the server is able to communicate over its normal network connection. Practically speaking, this limitation restricts in-band communication to times when the OS of the managed server is operational (online).

Out-of-band communication, which is not performed across the managed server's normal connection to the network, is a much more powerful tool for server management. In out-of-band communication, a "back door" communication channel is established by a remote server management tool (such as a remote console or terminal emulator) using some other interface with the server (such as (1) through the server's modem, (2) via a direct connection to a serial port, (3) through an infrared communication port, or (4) through a management Ethernet interface or the like).

In a sense, out-of-band communication is like opening an unobtrusive window through which the inner workings of the operation of the managed server may be observed. After the out-of-band communication link with the server is established, the remote server management tool communicates with the server to obtain data that will be useful to analyze a problem or potential problem. After a problem has been analyzed, out-of-band communication may be possible to control the managed server to overcome the problem or potential problem.

In addition to the distinction between in-band and out-of-band communication with a managed server, another important distinction is whether the managed server is online or offline. The term "online" refers to a managed server in which the OS is up and running. The managed server is said to be "offline" if its OS is not up and running. For the purpose of explaining the present technique, communications with a managed server will take place in one of these four states: (1) in-band online; (2) in-band offline; (3) out-of-band online; and (4) out-of-band offline.

An important goal in the development of remote server management tools is to increase the number of server problems that may be analyzed and repaired remotely (that is, without requiring direct, on-site intervention by a member of the network management team). To facilitate that goal, it is highly desirable to have a network management tool that is able to capture the maximum amount of information from a managed server in the maximum range of operational states of the server (for example, not powered up, fully operational or powered but locked up) and to allow control of the managed server based on that data.

Early remote management tools were able to analyze and address a relatively narrow range of managed server problems. One of the first remote server management tools had the ability to reset a managed server remotely by cycling power to turn the server off and on again via an out-of-band communication session over a phone line. In this way, a managed server could be reset whether in an online or offline condition. This tool, however, did not have the ability to assimilate data about the operation of the managed server or to analyze the cause of the managed server's failure. Accordingly, the principal utility of these early server management tools was to reset the managed server after catastrophic failure. These management tools were not useful for diagnosing subtle problems or preventing future failures.

Later server management tools employed proprietary software agents similar to device drivers to monitor a wide range of conditions in the managed server directly (for example, alerts and management parameters specified by the Simple Network Management Protocol ("SNMP")). The proprietary software agents in these management tools were designed to pass their data to the OS of the managed server, where it could be retrieved by remote access such as a remote management console application.

The large amount of data accessible by these management tools made them useful for diagnosing the cause of a wide range of server failures and permitting repair of those failures. A shortcoming of these server management tools, however, is that they rely primarily on communication between the managed server's OS and proprietary software agents that monitor conditions in the managed server. This limitation means that the tool is only operational when the managed server is online. Server management tools of this type are, accordingly, of little use in correcting problems in a managed server that is offline.

A still later generation of server management tools relied on a dedicated add-in card comprising an independent processor, memory, and battery backup. The add-in card essentially provided a dedicated management computer for monitoring and controlling the managed server. The dedicated management computer was hosted in the managed server and could communicate with the managed server (host) through an existing communication interface (for example, the PCI bus of the managed server).

Such remote management tools could additionally include software agent-based data gathering capability of the type used in earlier agent-based systems previously discussed. In this way, these remote management solutions combine the advantages of deep information gathering capability (software agent-based information gathering technology available when the OS of the managed server is online) with the ability to control the operation of the managed server independently via an out-of-band communication session using the dedicated server management computer system hosted in the managed server.

The add-in card type of remote management tool could also include the ability to automatically capture video data and reset sequences from the managed server. Video data captured in this way could be routed to be viewed by a user in real time or stored in a file for replay at a later time. Capture of video data in early management tools was limited to text image data only. Images are captured by snooping the PCI bus for transfers of information to the system video controller during key periods such as during boot-up and/or execution of POST.

Keyboard and mouse input data to the managed server could also be monitored. Graphical video data typically requires much more bandwidth to transfer than textual video data. In order to capture graphical video data, a remote server management tool would need to be adapted to capture data at much greater rates than prior remote server management tools. A remote server management tool could also be adapted to effectively slow down the transfer of graphical data to be able to capture it all.

In a typical remote management system employing a dedicated server management computer on an add-in card, a user (typically, a member of the network management team) could initiate an out-of-band session with the dedicated server management computer hosted in the managed server via a remote console application program being executed on a client computer. The dedicated management computer could be addressed by the user to control various aspects of the operation of the managed server via control circuitry connected to the embedded server management computer hosted by the managed server.

During a remote management communication session, the user could gain access to video data being displayed on the managed server in real time or to replay stored video data previously gathered from the managed server by the remote server management tool. If the remote server management tool is powerful enough, graphical video data as well as textual video data could be observed in real time or stored for later analysis. Thus, a remote user could have the ability to use the video data to remotely diagnose problems with the managed server.

The present invention is directed to further improvements of remote server management technology.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
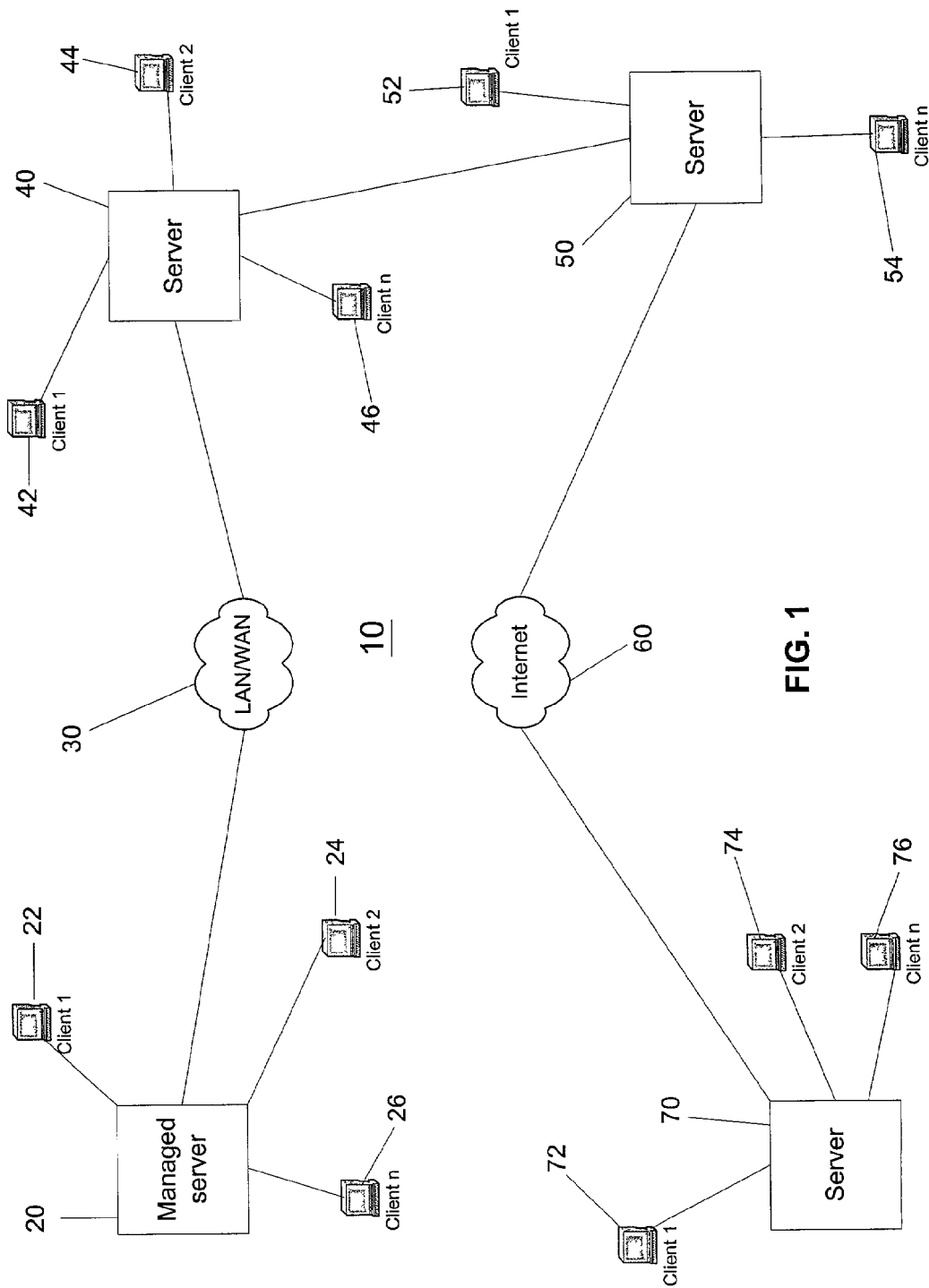
FIG. 1 is a block diagram illustrating an exemplary computer network system in which a remote server management controller of the present invention may be practiced.

Turning now to the drawings and referring initially to FIG. 1, a block diagram of an exemplary computer network system in which the present invention may be practiced is illustrated and designated using a reference numeral 10. The computer network 10 is intended to illustrate a typical modern computer network configuration with all its complexities and flexibility. A managed server 20 is connected to a plurality of client computers 22, 24 and 26. For purposes of explaining the present embodiment clearly, only one server on the network 10 has been designated as a "managed server." In practice, those of skill in the art will appreciate that the any or all of the servers in the network 10 could simultaneously include hardware and software devised according to the invention, making those servers "managed servers" as well.

The managed server 20 may be connected to as many as n different client computers. The magnitude of n is a function of the computing power of the managed server 20. If the managed server has large computing power (for example, faster processor(s) and/or more system memory) relative to other servers on the network, it will be able to effectively serve a relatively large number of client computers.

The managed server 20 is connected via a typical network infrastructure 30, which may consist of any combination of hubs, switches, routers and the like. While the network infrastructure 30 is illustrated as being either a local area network ("LAN") or wide area network ("WAN"), those skilled in the art will appreciate that the network infrastructure 30 may assume other forms such as a municipal area network ("MAN") or even the Internet.

The network infrastructure 30 connects the managed server 20 to server 40, which is representative of any other server in the network environment of managed server 20. The server 40 may be connected to a plurality of client computers 42, 44 and 46. The server 40 is additionally connected to server 50, which is in turn connected to client computers 52 and 54. The number of client computers connected to the servers 40 and 50 is dependent only on the computing power of the servers 40 and 50, respectively.

The server 40 is additionally connected to the Internet 60, which is in turn connected to a server 70. Server 70 is connected to a plurality of client computers 72, 74 and 76. As with the other servers shown in FIG. 1, server 70 may be connected to as many client computers as its computing power will allow.

Those skilled in the art will appreciate that neither the exact topology of the network illustrated in FIG. 1 nor the protocol of network communication (for example, Ethernet or any number of other common protocols) is a crucial aspect of the present invention. Moreover, the network topology shown in FIG. 1 is hypothetical and is shown only to explain the present invention with greater clarity by giving an example of a network environment in which the present invention is useful.

As explained in detail below, the present invention is illustrated as being deployed in a remote server management controller by way of example. The exemplary remote server management controller may be hosted in the managed server 20. The exemplary remote server management controller may be accessed via a remote console application program (or browser program) running on any of the client computers shown in FIG. 1.

Figure 2:
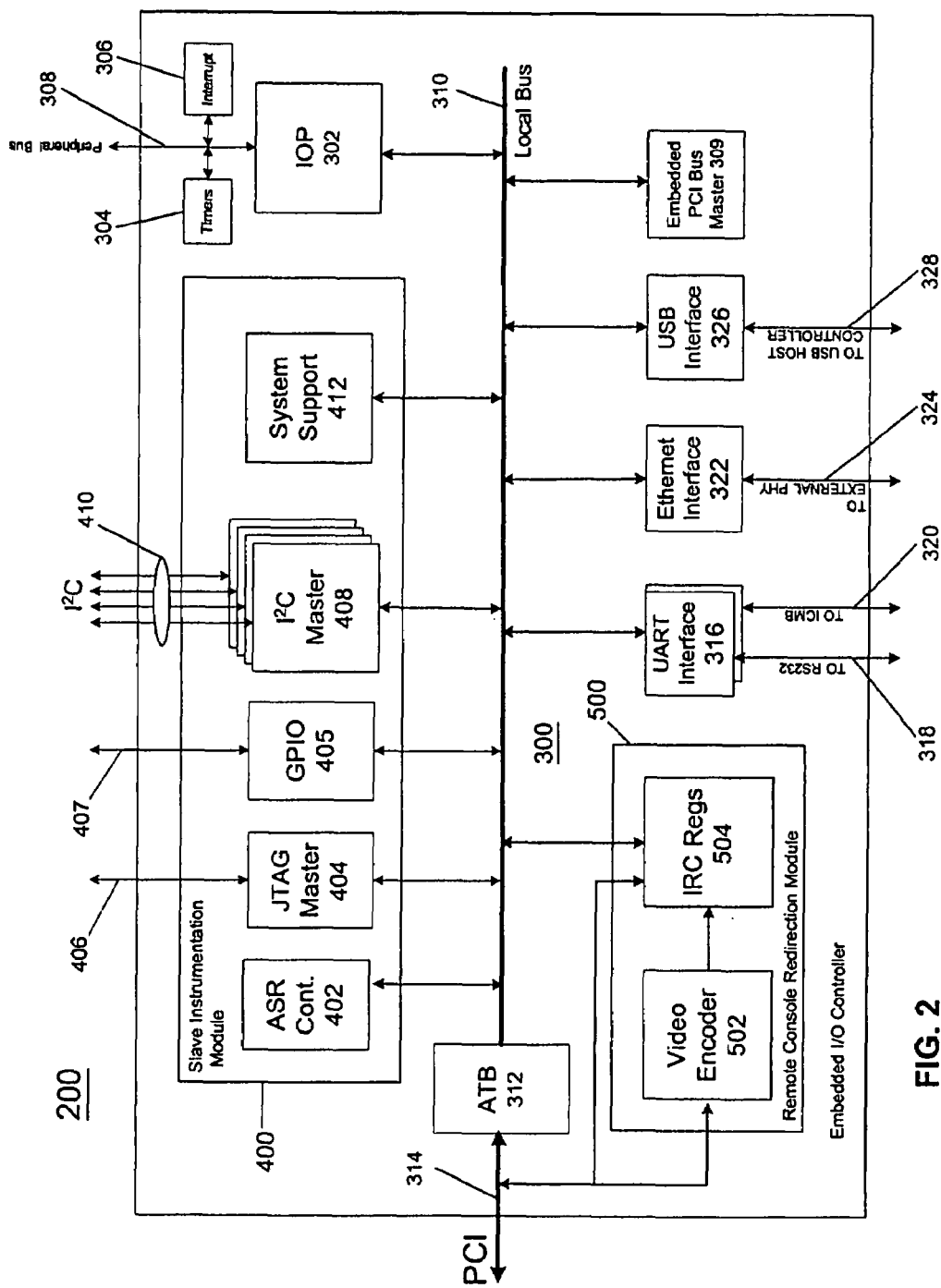
FIG. 2 is a functional block diagram of an exemplary embodiment of a remote server management controller constructed according to the present invention.

FIG. 2 shows a functional block diagram of one exemplary embodiment of a remote server management controller 200 constructed according to the present invention. The remote server management controller 200 may be implemented in a single application specific integrated circuit ("ASIC"). Alternatively, the remote server management controller 200 may be implemented in a plurality of integrated circuits or discrete components. Those skilled in the art will appreciate that implementation details such as deciding which functional aspects of remote server management controller 200 are implemented in a single ASIC or different ASICs are matters of design choice and not crucial aspects of the present invention.

For purposes of describing the invention clearly, the remainder of this description is written assuming that the remote server management controller 200 is implemented in a single ASIC incorporated into the motherboard of the managed server 20 (FIG. 1). Additionally, any of the client computers shown in FIG. 1 (whether connected directly to managed server 20 or to servers 40, 50 or 70) may establish communication with the remote server management controller 200 through its network connection as is more fully described below. Users may further interface with the remote server management controller 200 through additional communications interfaces such as a modem or other externally available serial connection such as a UART.

The remote server management controller 200 may be implemented so that it is powered and capable of operation whether or not the managed server 20 (FIG. 1) is powered up (turned on) or online. Powering the remote server management controller 200 regardless of whether the host managed server is turned on allows the remote server management controller 200 to monitor, analyze and potentially intervene to correct the widest possible range of system problems that may befall the managed server 20 (FIG. 1).

The logic of the remote server management controller 200 is broken down into three main functional blocks. The first of these three functional blocks is an embedded I/O controller 300, which is essentially an independent computer system that is integrated within the managed server 20 (FIG. 1). The second and third functional blocks of the remote server management controller 200 are a slave instrumentation module 400 and a remote console redirection module 500. As described below, the embedded I/O controller 300 monitors and controls a wide range of conditions in the managed server 20 via the slave instrumentation module 400 and the remote console redirection module 500.

The embedded I/O controller 300 comprises an Input/Output processor ("IOP") 302, which provides general control and functions as a management processor for the remote server management controller 200. The IOP 302 may be implemented as a 32-bit RISC processor, but other processor implementations may be employed as well. The IOP 302 is operatively coupled to a timer 304 and an interrupt controller 306 via a peripheral bus 308. In an exemplary embodiment of the invention, a memory controller (not shown) is operatively coupled to an internal local bus 310. The memory controller is, in turn, operatively coupled to dedicated memory via a memory interface. The dedicated memory may be battery-backed SRAM, SDRAM, ROM, NVRAM or any other appropriate type of memory.

The IOP 302 (located in the embedded I/O controller 300) is operatively coupled to the other functional modules (and many sub-modules) of the remote server management controller 200 via the internal local bus 310. Those of ordinary skill in the art will appreciate that the internal local bus 310 exists to allow communication between and among the logical components of the remote server management controller 200. The implementation details of the internal local bus 310 are a matter of design choice and not a crucial aspect of the present invention.

An address translation and bridging ("ATB") unit 312 is operatively coupled to the internal local bus 310 and to a PCI bus 314. PCI bus 314 is integral within and operatively coupled with the managed server 20 (FIG. 1). Preferably, the PCI bus 314, which serves as the main communication interface between the managed server 20 (FIG. 1) and the remote server management controller 200, may be configured as a 32-bit, 33 MHz PCI master/slave interface. In a typical system implementation, the remote server management controller 200 resides on the "compatibility" segment of PCI bus 314, but the PCI bus segment on which the remote server management controller is disposed is not a crucial aspect of the invention. The ATB unit 312 is constructed to allow the remote server management controller 200 to decode bus cycles on the PCI bus 314 and to communicate over the PCI bus 314 by initiating PCI bus cycles.

Although other protocols could be used for the main interconnect between remote server management controller 200 and managed server 20 (FIG. 1), PCI bus 314 is typically used instead of other slower interfaces such as ISA or LPC because the PCI bus 314 allows the transfer of much greater quantities of data. The remote server management controller 200 is capable of independent operation even if the PCI interface 314 is not operational because of a problem with managed server 20 (FIG. 1).

The embedded I/O controller 300 provides a plurality of communication interfaces that can be employed to establish out-of-band communication sessions with the remote server management controller 200. One such communication interface is a UART interface module 316, which is operatively coupled to internal local bus 310. The exemplary UART interface module 316 comprises two standard 16550 UARTs, each of which may provide a separate serial communication interface between the remote server management controller 200 and the external world. Both UARTs are mapped into the register space of the IOP 302 and can be accessed via PCI bus 314 or by the IOP 302. Either UART may be implemented so that it can be reset through a control register in the IOP 302.

Outputs from the UART interface module 316 are typically routed to transceivers (not shown), where they may be converted into a wide variety of serial interface types. Examples of the types of serial interfaces that may be provided by the UART interface module 316 are a standard RS-232 interface 318 or an interface that complies with the Intelligent Chassis Management Bus ("ICMB") specification promulgated by Intel Corporation (ICMB interface 320). Those of ordinary skill in the field will appreciate that the RS-232 interface 318 may be used to connect to a wide range of industry standard modems, terminal servers and the like.

In one exemplary embodiment, the RS-232 interface 318 and/or the ICMB interface 320 are accessible to a user from the external chassis of the managed server 20 (FIG. 1). A user may, accordingly, use an external communication device to engage in an out-of-band communication session with the remote server management controller 200 via the UART interface 318 or the ICMB interface 320.

Embedded I/O controller 300 further comprises an Ethernet interface 322, which is operatively coupled to the internal local bus 310. The Ethernet interface 322 provides the main external communication interface between the remote server management controller 200 and the outside world. In the exemplary embodiment shown in FIG. 2, the integrated portion of the Ethernet interface 322 includes a MAC (Media Access Controller), inbound and outbound FIFOs and a DMA engine to automatically transfer packets to and from memory. The Ethernet interface 322 requires a connection via interface 324 to an external PHY (not shown) and typical magnetic coupling to couple the PHY to the wire that serves as the transmission media.

Those skilled in the art will appreciate that a user may connect remotely to the remote server management controller 200 via the Ethernet interface 322. Such a connection may be made, for example, using a remote console application running on a client computer anywhere on the network that includes managed server 20 (FIG. 1). The user may, thus, engage in out-of-band communication with the remote server management controller 200 for the purpose of diagnosing, correcting and/or preventing problems with the managed server 20 (FIG. 1).

The embedded I/O controller 300 further comprises a USB interface 326, which is operatively coupled to the internal local bus 310. The USB interface 326 is connected to a USB host controller (not shown) via a USB host controller interface 328. In one exemplary embodiment of the invention, the USB interface 326 is connected to one port of a USB host controller, which is typically located in a south bridge portion of the chipset of the managed server 20 (FIG. 1). When implemented in this way, the IOP 302 of the remote server management controller 200 may establish "virtual USB peripherals" that will be seen and recognized by any USB-aware OS.

The exemplary embodiment of the embedded I/O controller 300 includes an embedded PCI bus master 309. The embedded PCI bus master is operatively coupled to the internal local bus 310.

The second major functional block of the remote server management controller 200 is the slave instrumentation module 400. The primary purpose of the slave instrumentation module 400 is to provide the hardware infrastructure to implement control and monitoring functions in the managed server 20 (FIG. 1) as dictated by the IOP 302 in conjunction with dedicated application software such as remote console management software running on a client computer.

The slave instrumentation module 400 comprises an automatic server recovery ("ASR") controller 402, which operates to automatically respond to catastrophic failures of the managed server 20 (FIG. 1). The ASR controller 402 is operatively coupled to the internal local bus 310. The ASR controller 402 continually monitors whether the OS of the managed server 20 (FIG. 1) is operational by controlling a dead-man timer that requires periodic servicing by the OS. If the OS of the managed server 20 (FIG. 1) does not service the dead-man timer within a predetermined time, the ASR controller 402 resets the processor of the managed server 20 (FIG. 1) causing the managed server 20 (FIG. 1) to reboot.

A general purpose input/output module ("GPIO") 405 is provided in the exemplary embodiment of the slave instrumentation module 400. The GPIO provides a versatile communication interface that may be used for a wide variety of purposes.

The slave instrumentation module 400 also comprises a JTAG master 404. The JTAG master 404 is operatively coupled to the internal local bus 310. The JTAG master 404 comprises a standard JTAG interface 406, which is operatively coupled to a corresponding standard JTAG interface (not shown) on the motherboard of the managed server 20 (FIG. 1). Through the JTAG master 404, the remote server management controller 200 can perform a wide range of control functions on the managed server 20 (FIG. 1). These functions include updating or repairing the BIOS of the managed server 20 by reprogramming the non-volatile memory where the BIOS resides.

The slave instrumentation module 400 further comprises an I²C master 408, which is operatively coupled with the internal local bus 310. The I²C master 408 has the capability of controlling a plurality of independent I²C serial channels 410. For purposes of example only, four (4) separate I²C channels are shown in FIG. 2. The I²C master 408 comprises a separate I²C engine for controlling each separate I²C channel.

The slave instrumentation module 400 additionally comprises a block of system support logic 412. The system support logic 412 is operatively coupled to the internal local bus 310. The system support logic 412 provides a variety of housekeeping and security functions for the managed server 20. Examples of these functions include providing the EISA bus ID, flash ROM support, ECC support, hot spare boot support, system post monitor support, floppy write protect, SMI base security measures, open hood detection and the like.

The third and final major functional block of the remote server management controller 200 is the remote console redirection module 500, which comprises a video encoder 502 and integrated remote console ("IRC") registers 504. The internal local bus 310 connects the remote console redirection module 500 to the IOP 302 and other components of the remote server management controller 200. Under the program control of the IOP 302, the remote console redirection module 500 acts as a virtual communication device ("VCD") that (1) snoops communications coming into the managed server 20 (FIG. 1) through some of the communications interfaces that are shared by the remote server management controller 200 and the managed server 20 (FIG. 1), or (2) receives server management communications through a dedicated communication interface.

The remote console redirection module 500 may snoop the PCI bus 314 and capture video data intended to be displayed via a video controller that is also disposed on the PCI bus 314 of the managed server 20 (FIG. 1). The video encoder stores the video data in a FIFO (see FIG. 3). If a large amount of graphical video data is being transferred via the PCI bus 314, the FIFO used by the video encoder 502 to collect the video data could approach an overflow condition if data is not processed and removed fast enough. To prevent an overflow condition and the concomitant loss of video data, the IOP 302 in the exemplary embodiment programs the embedded PCI bus master 309 to throttle the PCI bus 314 when the FIFO that stores captured video data fills to a predetermined level (for example, when the FIFO is half full).

Figure 3:
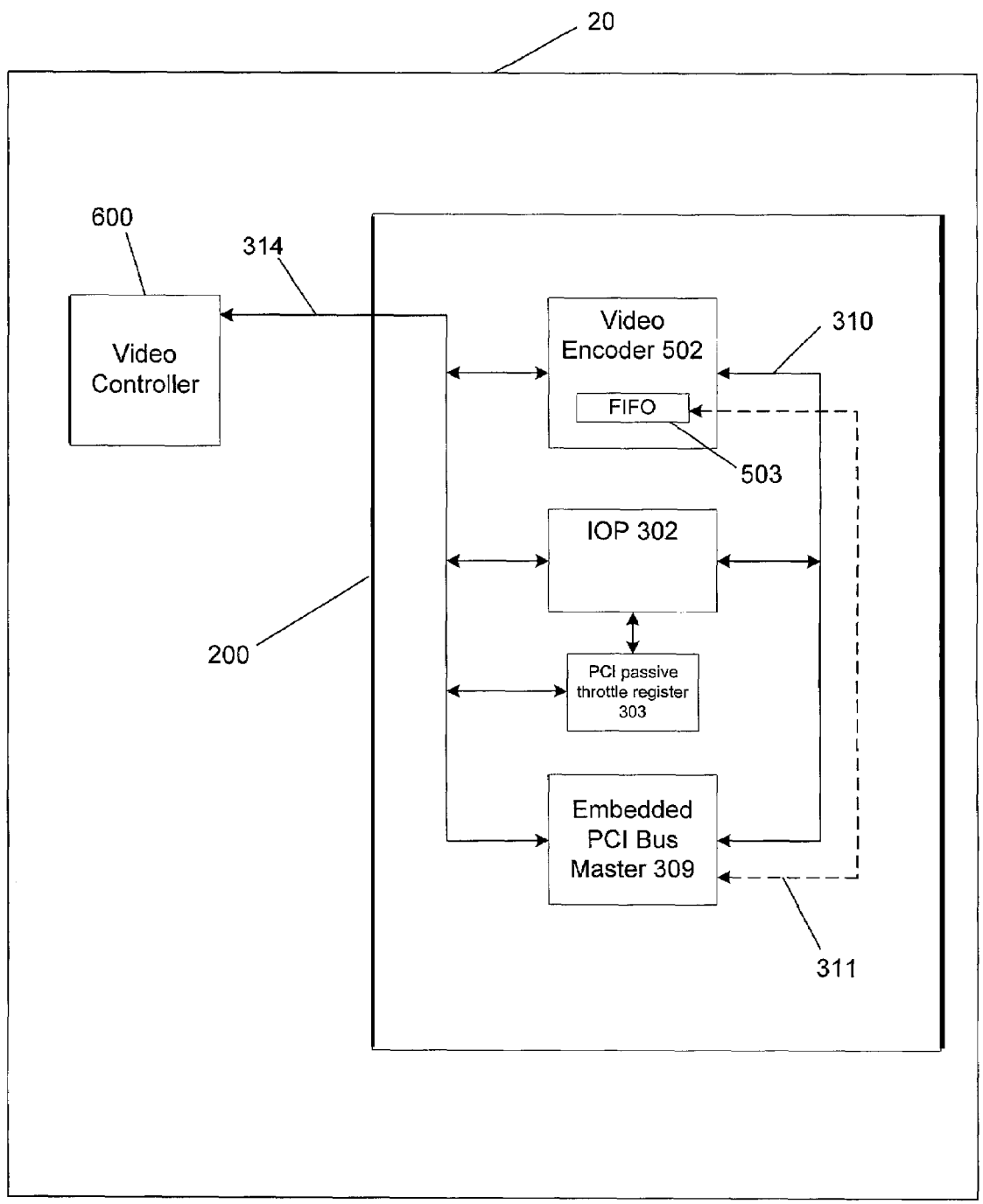
FIG. 3 is a block diagram showing an exemplary embodiment of an operating environment of an IOP in relation to a remote server management controller and a managed server.

FIG. 3 is a block diagram showing an exemplary embodiment of an operating environment of the remote server management controller 200 in the managed server 20. The IOP 302 is operatively connected to a video controller 600 via the PCI bus 314. The details of the connection between the IOP 302 and the PCI bus 314 have been simplified in FIG. 3 for purposes of clarity (for example, the ATB 312 has been omitted). Those details are not a crucial aspect of the invention.

As set forth above, the remote server management controller 200 snoops the PCI bus 314 to capture video data destined for the video controller 600. Video data captured in this manner is stored in a FIFO 503, which is associated with and accessible by the video encoder 502, for later processing. In the exemplary embodiment, the FIFO 503 is shown as a component of the video encoder 502, but those of ordinary skill in the art will appreciate that the FIFO 503 may be implemented external to the video encoder 503. The FIFO 503 is adapted to communicate with the embedded PCI bus master 309, either via the internal local bus 310 or, alternatively, by a direct communication path 311. The details of how the FIFO 503 is adapted to communicate with the embedded PCI bus master 309 are not a crucial aspect of the invention.

When the remote server management controller 200 is snooping PCI traffic, it is typically neither the initiator nor the target of the PCI transaction cycles that are occurring on the PCI bus 314 (such as video cycles). Without being the initiator or target of PCI cycles, the remote server management controller 200 has no way to actively slow down or otherwise throttle these cycles on the PCI bus. The embedded PCI bus master 309 is provided to allow the remote server management controller 200 to initiate PCI transactions that consume PCI bus bandwidth resulting in a throttling effect on the PCI bus 314. The throttling effect reduces the likelihood that the FIFO 503 will overflow from overflowing with snooped data.

In the exemplary embodiment, a PCI passive throttling register 303 is associated with and accessible by the IOP 302. PCI transactions initiated by the embedded PCI bus master 309 may be targeted to the PCI passive throttling register 303.

In the exemplary embodiment, the embedded PCI bus master 309 initiates a PCI read transaction automatically when the FIFO 503 becomes full to a predetermined level. A signal to initiate the read transaction may be provided to the embedded PCI bus master 309 by logic associated with the FIFO 503 when the FIFO 503 fills to a predetermined level. The exact method of causing the embedded PCI bus master 309 to initiate the read transaction is not a crucial aspect of the invention. As one alternative, a register associated with the IOP 302, the FIFO 503 or the embedded PCI bus master 309 may be set with data that corresponds to a predetermined level of fullness of the FIFO 503. The embedded PCI bus master 309 may be programmed to initiate a read transaction when the fullness of the FIFO 503 corresponds to the data in the register.

Another alternative way in which the embedded PCI bus master 309 may be signaled to initiate a read transaction is to be commanded by the IOP 302. The IOP 302 may be notified (for example, with an interrupt) when the FIFO 503 fills to a predetermined level and may responsively command the initiation of the read cycle by the embedded PCI bus master 309. Another alternative is for the IOP 302 302 to programmed to monitor the status of the FIFO 503 and cause the embedded PCI bus master 309 to initiate the read transaction when the IOP 302 determines that the FIFO 503 has become full to a predetermined level.

When the embedded PCI bus master 309 initiates a PCI transaction, it effectively consumes bandwidth on the PCI bus 314. The consumption of PCI bus bandwidth prevents further control of the PCI bus 314 by any device that might be writing data to the video controller 600. While the PCI bus 314 is owned by the embedded PCI bus master 309, the FIFO 503 continues to be emptied by processing the data stored therein. This alleviates a possible overflow condition of the FIFO 503 by allowing video data to be emptied from the FIFO 503 while no additional video data is being transferred via the PCI bus 314.

The duration in which the embedded PCI bus master 309 owns the PCI bus 314 is programmable in the exemplary embodiment of the invention. The PCI passive throttling register 303 is eight bits in length in the exemplary embodiment, but the register size is not a crucial aspect of the invention. The PCI passive throttling register 303 may be programmed with a value corresponding to a period of time to preclude other devices from obtaining control of the PCI bus 314. The value may correspond to a fixed length of time or any relative duration. In the exemplary embodiment, the PCI passive throttling register 303 is programmed with a value that corresponds to a number of PCI clock cycles.

When the embedded PCI bus master initiates a read transaction, it targets the PCI passive throttling register 303. When the embedded PCI bus master 309 has read the value contained in the PCI passive throttling register 303, it inserts wait states for a number of PCI clock cycles corresponding to the value obtained from the PCI passive throttling register 303. In the exemplary embodiment, wait states are inserted by not asserting the target ready ("TRDY") signal for a number of clock cycles corresponding to the value read from the PCI passive throttling register 303.

A value may be written to the PCI passive throttling register 303 in a single PCI clock cycle (in other words, without initiating a hold on the PCI bus 314). The PCI passive throttling register 303 may also be written to directly by IOP without holding the PCI bus 314. Further, the value in the PCI passive throttling register 303 may be read by the IOP 302 without initiating a hold. In the exemplary embodiment, the PCI bus 314 is only held when a PCI device such as the embedded PCI bus master 309 initiates a PCI read transaction on the PCI passive throttling register 303.

The value stored in the PCI passive throttling register 303 may be stored when the IOP 302 is initialized or it may be written on the fly after initialization. The value in the PCI passive throttling register 303 may be written a single time, or it may be updated periodically depending on conditions in the managed server 20 or the remote management server controller 200. For example, the value stored in the PCI passive throttling register 303 may be updated with a value that is proportional to the relative volume of video traffic on the PCI bus 314 or the speed or rate at which the FIFO 503 in the video encoder 502 are being filled. The number of wait states generated may be automatically adjusted based on a depth setting of the FIFO 503. For example, more wait states may be added proportional to how full the FIFO 503 becomes.

Figure 4:
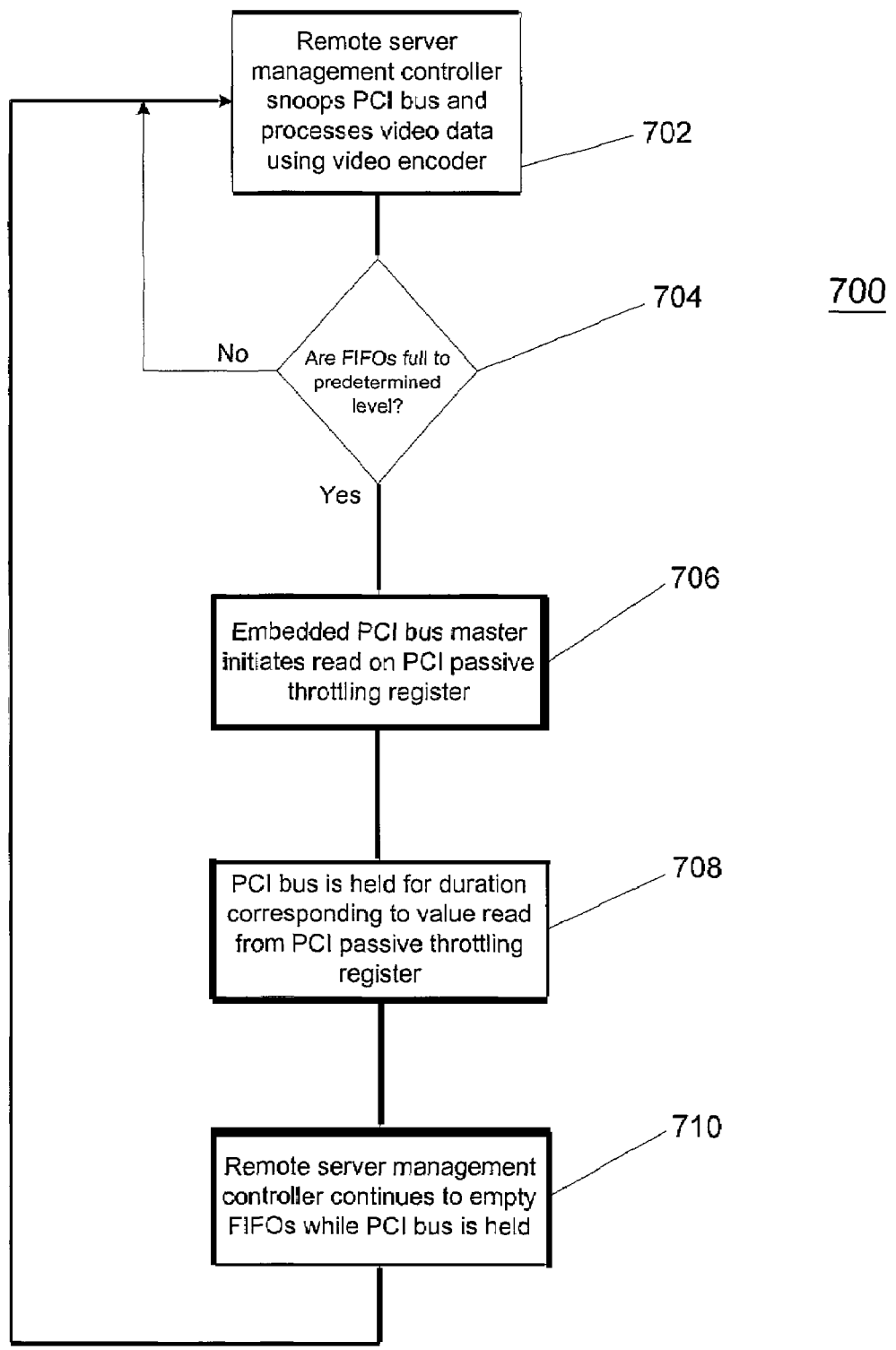
FIG. 4 is a process flow diagram showing an exemplary process for passively throttling a PCI bus.

FIG. 4 is a process flow diagram showing an exemplary process for passively throttling a PCI bus. The overall process is referred to by reference numeral 700. At 702, the remote server management controller 200 snoops the PCI bus 314 to identify video data that is being written to the video controller 600. At 704, a decision is made about whether the FIFO 503 has become full to a predetermined level. If the FIFO has not reached the predetermined level, snooping of video data continues at 702. If the FIFO 503 has become full to a predetermined level, the embedded PCI bus master 309 initiates a read transaction on the PCI bus 314 to read a value stored in the PCI passive throttling register 303 (706). The read transaction is targeted to the PCI passive throttling register 303.

The PCI bus is held for a duration corresponding to the value read from the PCI passive throttling register 303 at 708. While the PCI bus is held, the IOP continues to empty the FIFO 503, as shown at 710. After the hold on the PCI bus ends, snooping for additional video data continues at 702.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A remote server management controller that snoops data from a communication bus, the remote server management controller comprising:
   a FIFO that is adapted to store data snooped from the communication bus;
   an embedded bus master that is operatively connected to the communication bus, the embedded bus master being adapted to take control of the communication bus responsive to a signal that the FIFO has become filled to a predetermined level to prevent the FIFO from being overflowed with snooped data while snooped data stored in the FIFO continues to be processed, wherein taking control of the communication bus comprises slowing a rate of snooped data arrival at the FIFO wityhout diverting the snooped data;
   a passive throttling register that stores a value; and
   wherein the embeded bus master takes control of the communication bus by reading the value and preventing communication on the communication bus for a time period that corresponds to the value.

2. The remote server management controller of claim 1, wherein the communication bus is a PCI bus.

3. The remote server management controller of claim 1, wherein the value is a number of PCI clock cycles.

4. The remote server management controller of claim 1, wherein the embedded bus master is adapted to take control of the communication bus by initiating a PCI read transaction on the passive throttling register.

5. The remote server management controller of claim 1, wherein the value is stored in the passive throttling register when the remote server management controller is initialized.

6. The remote server management controller of claim 1, wherein the value is updated periodically.

7. The remote server management controller of claim 1, wherein the value is proportional to a volume of traffic on the communication bus.

8. A managed server, comprising:
a video controller that is operatively connected to a communication bus; and
a remote server management controller that is connected to the communication bus and adapted to snoop data that is intended for the video controller from the communication bus, the remote server management controller comprising:
a FIFO that is adapted to store data snooped from the communication bus; and
an embedded bus master that is operatively connected to the communication bus, the embedded bus master being adapted to take control of the communication bus responsive to a signal that the FIFO has become filled to a predetermined level to prevent the FIFO from being overflowed with snooped data while snooped data stored in the FIFO continues to be processed, wherein taking control of the communication bus comprises intiating a read transaction on the communication bus.

9. The managed server of claim 8, further comprising:
a passive throttling register that stores a value; and
wherein the embedded bus master takes control of the communication bus by reading the value and preventing communication on the communication bus for a time period that corresponds to the value.

10. The managed server of claim 9, wherein the value is a number of PCI clock cycles.

11. The managed server of claim 9, wherein the embedded bus master is adapted to take control of the communication bus by initiating a PCI read transaction on the passive throttling register.

12. The managed server of claim 9, wherein the value is stored in the passive throttling register when the remote server management controller is initialized.

13. The managed server of claim 9, wherein the value is updated periodically.

14. The managed server of claim 9, wherein the value is proportional to a volume of traffic on the communication bus.

15. The managed server of claim 8, wherein the communication bus is a PCI bus.

16. A method of passively throttling a communication bus, comprising the acts of:
snooping a communication bus;
storing data snooped from the communication bus in a storage device;
determining if the storage device is filled to a predetermined level; and
preventing further transfers of data on the communication bus responsive to the act of determining if the storage device is filled to a predetermined level, wherein preventing further transfers of data comprises intiating a read tranaction on the communication bus.

17. The method of claim 16, further comprising the acts of:
storing a value in a register;
reading the value; and
wherein the act of preventing further transfers of the specific type of data is performed for a time period that corresponds to the value.

18. The method of claim 16, wherein the recited acts are performed in the recited order.

19. A server comprising:
a bus;
a queue communicatively coupled to the bus and configured to store data snooped from the bus; and
a bus communicatively coupled to the bus, the bus master configured to throttle a flow of snooped data from the bus to the queue if a predetermined amount of data is stored in the queue, wherein throttling the flow of snooped data comprises slowing a rate of snooped data arrival to the queue without diverting the snooped data by intiating at least one read transaction on the bus.

20. The server of claim 19, wherein the server is configured to process the snooped data stored the queue while the us mster is throttling the flow snooped data.

21. The server of claim 19, wherein the bus mster is configured to throttle the flow of snooped data by preventing communication on the bus for a predetermined amount of time.

22. The server of claim 19, wherein the bus comprises a PCI-compatible bus.

* * * * *

UNITED STATES PATENT AND TRADEMARK OFFICE
CERTIFICATE OF CORRECTION

| | | |
|---|---|---|
| PATENT NO. | : 7,287,107 B2 | |
| APPLICATION NO. | : 10/037502 | |
| DATED | : October 23, 2007 | |
| INVENTOR(S) | : Robert L. Noonan et al. | |

It is certified that error appears in the above-identified patent and that said Letters Patent is hereby corrected as shown below:

In column 1, line 61, delete "modem" and insert -- modern --, therefor.

In column 11, line 3, after "IOP 302" delete "302".

In column 12, line 45, in Claim 1, delete "wityhout" and insert -- without --, therefor.

In column 12, line 47, in Claim 1, delete "embeded" and insert -- embedded --, therefor.

In column 13, line 19, in Claim 8, delete "intiating" and insert -- initiating --, therefor.

In column 14, line 11, in Claim 16, delete "intiating" and insert -- initiating --, therefor.

In column 14, line 12, in Claim 16, delete "tranaction" and insert -- transaction --, therefor.

In column 14, line 26, in Claim 19, insert -- master -- before "communicatively".

In column 14, line 32, in Claim 19, delete "intiating" and insert -- initiating --, therefor.

In column 14, line 34, in Claim 20, after "stored" insert -- in --.

In column 14, line 35, in Claim 20, delete "us mster" and insert -- bus master --, therefor.

UNITED STATES PATENT AND TRADEMARK OFFICE
CERTIFICATE OF CORRECTION

PATENT NO. : 7,287,107 B2
APPLICATION NO. : 10/037502
DATED : October 23, 2007
INVENTOR(S) : Robert L. Noonan et al.

It is certified that error appears in the above-identified patent and that said Letters Patent is hereby corrected as shown below:

In column 14, line 36, in Claim 21, delete "mster" and insert -- master --, therefor.

Signed and Sealed this

First Day of July, 2008

JON W. DUDAS
*Director of the United States Patent and Trademark Office*